(No Model.)

W. L. BOGART.
CULTIVATOR.

No. 249,879. Patented Nov. 22, 1881.

Witnesses:
Peter Martin
John Clark

Inventor:
William L. Bogart

UNITED STATES PATENT OFFICE.

WILLIAM L. BOGART, OF NEBO, ILLINOIS.

CULTIVATOR.

SPECIFICATION forming part of Letters Patent No. 249,879, dated November 22, 1881.

Application filed July 18, 1881. (No model.)

*To all whom it may concern:*

Be it known that I, WM. L. BOGART, a citizen of the United States, residing at Nebo, in the county of Pike and State of Illinois, have invented a new and useful Cultivator-Adjuster, of which the following is a specification.

This invention relates to a novel mode of attaching cultivator-teeth or shovels to their standards, whereby they can be set square to the land or adjusted so as to present their faces either outward or inward, as may be required in cultivating crops, and also whereby the teeth or shovels are rigidly and strongly secured to their standards and sustained against backward strain by a curved bracing-plate, to which each shovel is pivoted and stayed, as will be hereinafter explained.

The following description of my invention, when taken in connection with the annexed drawings, will enable others skilled in the art to fully understand it.

Figure 1:
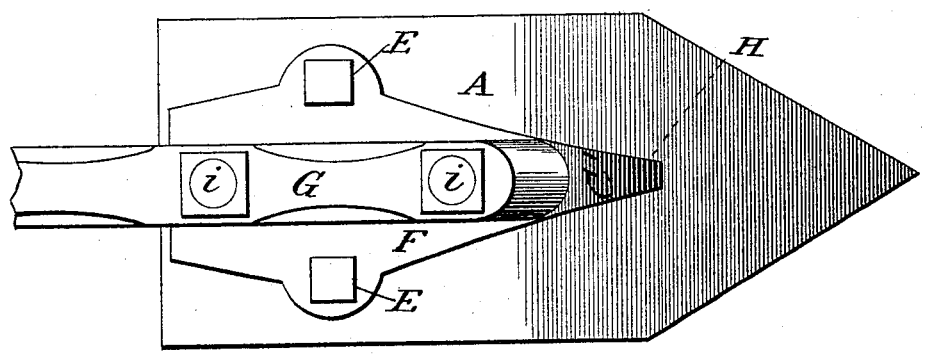
Figure 2:
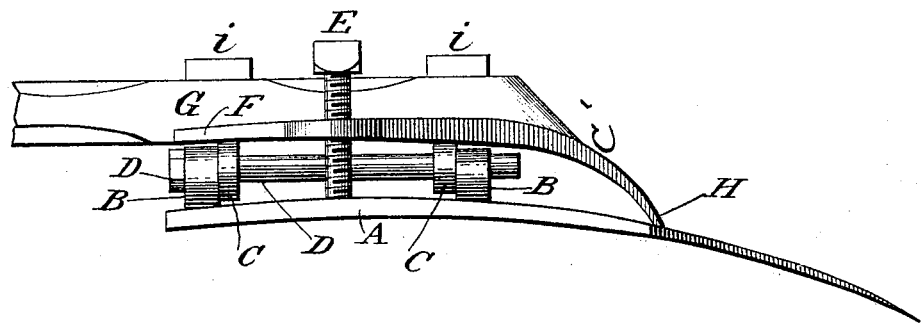

Figure 1 is a back view of a shovel or cultivator-tooth and it attachments. Fig. 2 is a side view projected from Fig. 1.

In the annexed drawings, A designates a shovel or tooth of the shape shown, or of any other suitable shape. To this shovel two eyes, B B, are rigidly secured by riveting or otherwise, which eyes are arranged one above the other on the back of the shovel and in the middle of its width.

F designates a back plate, which is formed with wings, and also with a lower tapered and curved portion, C', the lower end of which terminates in a square bearing at H. This back plate is made thick and strong, and it is recessed into the front of the standard G.

C C designate two eyes formed on the ends of bolts $i\ i$, which are used with nuts to rigidly secure the back plate, F, to its standard G. The eyes of the bolts form shoulders for them, to allow the nuts to draw the plate F tightly home, and these eyes serve, in combination with the two eyes B B and a pintle or bolt, D, as the means for hinging the shovel A to the standard, as shown in Fig. 2.

E E designate two adjusting and set screws, which are tapped through the laterally extended wings of the plate F, so as to bear against the shovel on opposite sides of the pintle or bolt D. By means of these bolts the shovel can be adjusted about the axis of the hinge and rigidly fixed at any desired angle; or, when desired, the shovel can be adjusted so as to run squarely to the land.

It will be seen that the lower end of the curved extension of the plate F abuts against the back of the shovel near its point and sustains this part of the shovel against the pressure brought against it while running in the soil. The plate F serves to stiffen and strengthen the lower part of the standard, and also as a means for using the adjusting and bracing screws E E.

Having described my invention, I claim—

The combination, with the shovel A and its eyes B B, of the eyes C C, bolts $i\ i$, pintle D, plate F, its adjusting-screws E, and its curved bracing-extension C' for the shovel, all substantially as described.

WILLIAM L. BOGART.

Witnesses:
PETER MARTIN,
JOHN CLARK.